F. BROWN.
Fog Signal.
No. 66,942. Patented July 23, 1867.
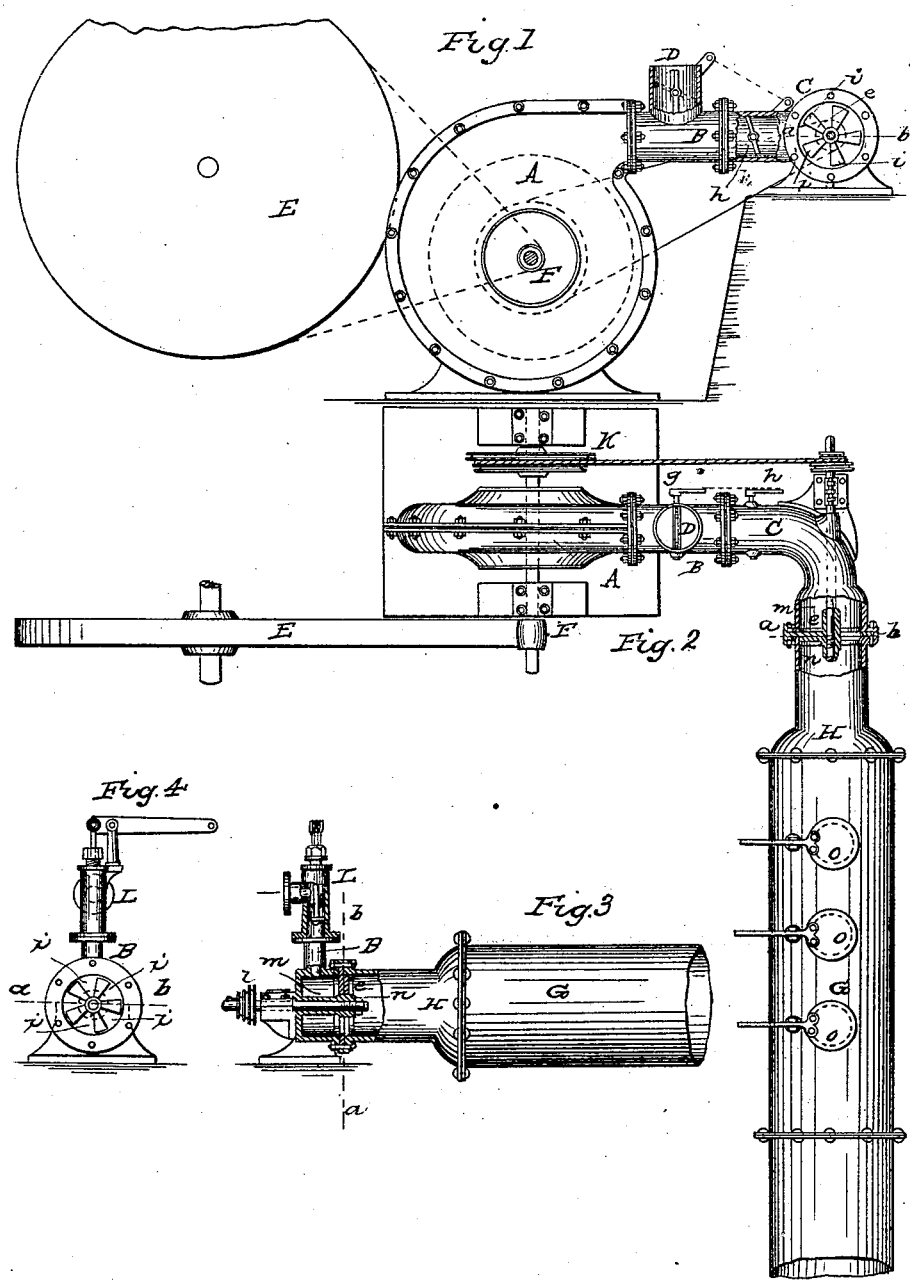

UNITED STATES PATENT OFFICE.

FELIX BROWN, OF NEW YORK, N. Y., ASSIGNOR TO JOHN GEORGE GUNTHER, OF STATE OF NEW YORK.

IMPROVEMENT IN FOG-SIGNALS.

Specification forming part of Letters Patent No. 66,942, dated July 23, 1867.

*To all whom it may concern:*

Be it known that I, FELIX BROWN, of the city, county, and State of New York, have invented a new and Improved Fog-Signal; and I hereby declare the following to be a full, clear, and exact description thereof, reference being had to the annexed drawings, making a part of this specification, in which—

Figure 1 represents a side view of my fog-signal set in motion by a blower; Fig. 2, a horizontal view of the same; Fig. 3, a side view of a fog-signal set in motion by steam or compressed air; Fig. 4, a cross-section through line *a b* of Fig. 3. Figs. 1, 2, and 3 represent the fog-signal partly in sections.

The same letters of reference mark the same parts in all these figures.

The only method to produce strong sounds available for the purpose of fog-signals at present in use consists in causing a vibration of a bell-shaped metallic piece, as in the steam-whistle, or by causing a vibration of a fine metallic plate, as in the fog-horn, while in the fog-signal of my construction the sound-vibration is produced by the rotation of perforated disks or plates; hence the nature of my invention consists in the application of air, compressed air, or steam to two perforated disks, one or both of which are kept in rotation, whereby, by the sudden and continuous cutting off of said air, compressed air, or steam, the strongest possible sound may be produced.

In the annexed drawing, A represents the blower or ventilator. B represents the blow-pipe; C the air-chamber. D is the discharge-pipe; E, a pulley, which, in connection with the small pulley F, serves to rotate the ventilator. *g* and *h* represent throttle-valves—the former in the discharge-pipe and the latter in the blow-pipe—which are so connected and operated that the one will shut when the other opens. *e* and *n* represent the two perforated disks or plates, movable on an axle, *m*.

In the drawing, one of the disks, *n*, is fast to the said axle, and turns with it, while the other disk, *e*, is permanently fastened to the air-chamber.

The perforations on the two disks represented in the drawing consist of five regular openings, *i i i i i*, inserted in equal distances, and identical in both disks. The shape and number of these perforations may be varied as required by the size of the pipe, or by the speed with which the disks are to be turned.

The axle *m* is turned by means of two pulleys, *l* and *k*.

G represents the sound-tube or trumpet, through which the air passes after being forced through the perforations of the two disks. The trumpet is so constructed that a short distance from the disks it widens by a parabolically-shaped hollow, H. The trumpet has several key-valves, O O O, which serve to create different tones, and to form combinations of different sounds. When all said key-valves are open the highest tone is produced.

Figs. 3 and 4 represent the fog-signal when operated by steam or compressed air. The construction is the same, the difference being that in these last two figures the blow-pipe B is much smaller in proportion to the trumpet G than in those already described. The compressed air or steam is admitted through a valve, L, and no discharge-pipe is required.

This apparatus is used in the following manner: The two disks or plates *n* and *e* (or one of them) are turned by any suitable means; and during said rotation, air, compressed air, steam, or other gaseous fluid is blown through the constantly-varying openings of the two disks into the sound-tube or trumpet, whereby not only a strong tone will be produced, but one which may be easily varied in height or volume, so as to obtain combination signals by sounds not attainable in any other known manner.

Having thus described my invention, what I claim as new, and desire to secure by Letters Patent, is—

1. The blowing of air, compressed air, steam, or other gaseous fluid through perforations of disks or plates while one or both of them are rotating, substantially in the manner described.

2. Constructing the sound-tube or trumpet with a parabolically-shaped extension, substantially in the manner and for the purpose described.

FELIX BROWN.

Witnesses:
 CHS. WEHLE,
 GUSTAV ZIMMERMANN.